US011503533B2

(12) United States Patent
You et al.

(10) Patent No.: US 11,503,533 B2
(45) Date of Patent: Nov. 15, 2022

(54) METHOD OF REGISTRATION WITH ACCESS AND MOBILITY MANAGEMENT FUNCTION RE-ALLOCATION

(71) Applicant: ZTE CORPORATION, Guangdong (CN)

(72) Inventors: Shilin You, Shenzhen (CN); Jiyan Cai, Shenzhen (CN); Jin Peng, Shenzhen (CN); Jinguo Zhu, Shenzhen (CN); Shuang Liang, Shenzhen (CN); Fei Lu, Shenzhen (CN); Wantao Yu, Shenzhen (CN); Zhaoji Lin, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 17/674,068

(22) Filed: Feb. 17, 2022

(65) Prior Publication Data

US 2022/0174580 A1 Jun. 2, 2022

Related U.S. Application Data

(63) Continuation of application No. PCT/CN2019/101333, filed on Aug. 19, 2019.

(51) Int. Cl.
*H04W 4/00* (2018.01)
*H04W 40/36* (2009.01)
(Continued)

(52) U.S. Cl.
CPC ........... *H04W 40/36* (2013.01); *H04W 12/06* (2013.01); *H04W 12/102* (2021.01); *H04W 60/04* (2013.01)

(58) Field of Classification Search
CPC ... H04W 76/00; H04W 40/36; H04W 12/102; H04W 12/06
See application file for complete search history.

(56) References Cited

U.S. PATENT DOCUMENTS

2018/0317157 A1* 11/2018 Baek .................. H04W 28/16
2020/0059989 A1* 2/2020 Velev ................. H04W 76/30
(Continued)

FOREIGN PATENT DOCUMENTS

| CN | 110022206 A | | 7/2019 |
|---|---|---|---|
| WO | WO2019/097084 | * | 5/2019 |
| WO | WO-2019/097084 A1 | | 5/2019 |

OTHER PUBLICATIONS

Huawei et al. Registration failure in registration procedure with AMF reallocation caused by slicing 3GPP TSG-SA WG3 Meeting #95 S3-191411 May 10, 2019(May 10, 2019) whole document.
(Continued)

*Primary Examiner* — Shantell L Heiber
(74) *Attorney, Agent, or Firm* — Foley & Lardner LLP

(57) ABSTRACT

A system and method of registration with AMF re-allocation. The system and method includes receiving, by an initial AMF from a wireless communication device via a RAN, a registration request comprising a first device identifier associated with the wireless communication device. The system and method includes determining, by the initial AMF, an identifier type associated with the first device identifier. The system and method includes generating, by the initial AMF, a reroute message comprising a second device identifier. The system and method includes originating, by the initial AMF to the wireless communication device, a security mode command message comprising a redirection criteria or an integrity negotiation algorithm, the security mode command message causes the wireless communication device to set the redirection criteria allowing the wireless communication device to accept a request message that is not integrity protected and return a security mode complete message to the initial AMF.

20 Claims, 8 Drawing Sheets

(51) Int. Cl.
*H04W 12/102* (2021.01)
*H04W 12/06* (2021.01)
*H04W 60/04* (2009.01)

(56) References Cited

U.S. PATENT DOCUMENTS

2020/0228987 A1* 7/2020 Ben Henda .......... H04W 76/11
2021/0014781 A1* 1/2021 Ianev .................. H04W 48/18
2021/0168613 A1* 6/2021 Suh .................... H04W 76/11

OTHER PUBLICATIONS

Huawei et al. Registration failures in registration procedure with AMF reallocation 3GPP TSG-SA WG3 Meeting #95Bis S3-192454 Jun. 26, 2019(Jun. 26, 2019).
International Search Report and Written Opinion for PCT App. No. PCT/CN2019/101333 dated May 18, 2020.

* cited by examiner

700 receiving, by a target access and mobility management function (AMF) from an initial AMF via a radio access network (RAN), a reroute message comprising a second device identifier, the reroute message generated by the initial AMF responsive to receiving a registration request comprising a first device identifier associated with a wireless communication device and determining an identifier type associated with the first device identifier
702 authenticating, by the target AMF responsive to receiving the reroute message, the wireless communication device with the target AMF
704 transmitting, by the target AMF, a security mode command to the wireless communication device indicating that the target AMF authenticated the wireless communication device
706

FIG. 7

000
METHOD OF REGISTRATION WITH ACCESS AND MOBILITY MANAGEMENT FUNCTION RE-ALLOCATION

CROSS-REFERENCE TO RELATED APPLICATION

This application claims the benefit of priority under 35 U.S.C. § 120 as a continuation of PCT Patent Application No. PCT/CN2019/101333, filed on Aug. 19, 2019, the disclosure of which is incorporated herein by reference in its entirety.

TECHNICAL FIELD

The disclosure relates generally to wireless communications and, more particularly, to systems and methods for registration with access and mobility management function re-allocation.

BACKGROUND

The standardization organization Third Generation Partnership Project (3GPP) is currently in the process of specifying a new Radio Interface called 5G New Radio (5G NR) or G-Universal Mobile Telecommunications System (UMTS) Terrestrial Radio Access (GUTRA) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions, have been simplified with most of them being software based so that they could be adapted according to need.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

In one embodiment, a method includes receiving, by an initial access and mobility management function (AMF) from a wireless communication device via a radio access network (RAN), a registration request comprising a first device identifier associated with the wireless communication device. In some embodiments, the method includes determining, by the initial AMF, an identifier type associated with the first device identifier. In some embodiments, the method includes generating, by the initial AMF, a reroute message comprising a second device identifier. In some embodiments, the method includes originating, by the initial AMF to the wireless communication device, a security mode command message comprising a redirection criteria or an integrity negotiation algorithm, the security mode command message causes the wireless communication device to set the redirection criteria allowing the wireless communication device to accept a request message that is not integrity protected and return a security mode complete message to the initial AMF.

In another embodiment, a method includes receiving, by a target access and mobility management function (AMF) from an initial AMF via a radio access network (RAN), a reroute message comprising a second device identifier, the reroute message generated by the initial AMF responsive to receiving a registration request comprising a first device identifier associated with a wireless communication device and determining an identifier type associated with the first device identifier. In some embodiments, the method includes authenticating, by the target AMF responsive to receiving the reroute message, the wireless communication device with the target AMF. In some embodiments, the method includes transmitting, by the target AMF, a security mode command to the wireless communication device indicating that the target AMF authenticated the wireless communication device.

In another embodiment, a method includes transmitting, by a wireless communication device to an initial access and mobility management function (AMF) via a radio access network (RAN), a registration request comprising a first device identifier associated with the wireless communication device, the registration request causing the initial AMF to determine an identifier type associated with the first device identifier, generate a reroute message comprising a second device identifier, and originate to the wireless communication device a security mode command message comprising a redirection criteria or an integrity negotiation algorithm. In some embodiments, the method includes receiving, by the wireless communication device from the initial AMF, the security mode command message. In some embodiments, the method includes setting, by the wireless communication device responsive to receiving the security mode command message, the redirection criteria allowing the wireless communication device to accept a request message that is not integrity protected. In some embodiments, the method includes transmitting, by the wireless communication device responsive to receiving the security mode command message, a security mode complete message to the initial AMF.

The above and other aspects and their embodiments are described in greater detail in the drawings, the descriptions, and the claims.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

FIG. 7 is a flow diagram depicting a method for registration with access and mobility management function re-allocation from the perspective of a target AMF, in accordance with some embodiments of the present disclosure.

DETAILED DESCRIPTION

Figure 1:
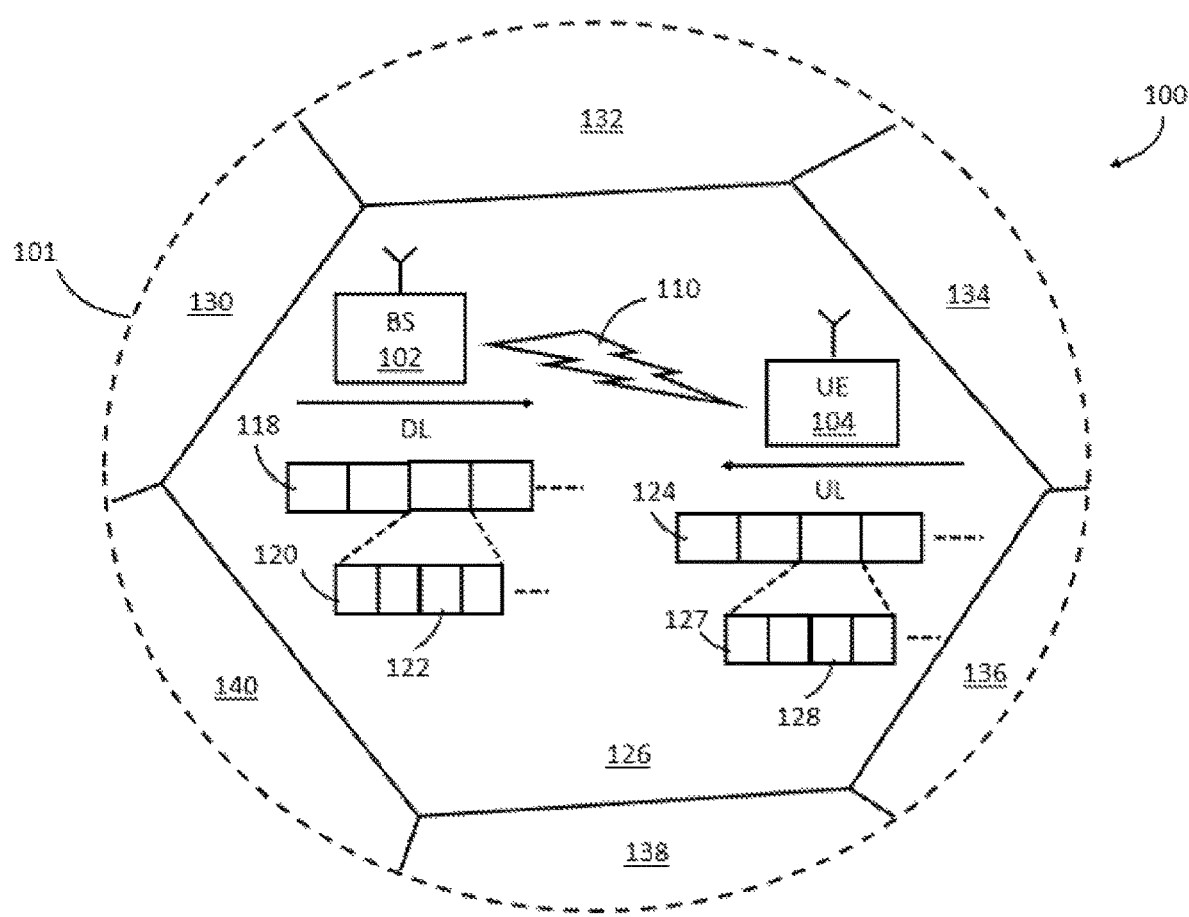
FIG. 1 illustrates an example cellular communication network in which techniques disclosed herein may be implemented, in accordance with an embodiment of the present disclosure.

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

The following acronyms are used throughout the present disclosure:

3GPP 3rd Generation Partnership Project
5G 5th Generation Mobile Networks
5G-AN 5G Access Network
5G gNB Next Generation NodeB
5G-GUTI 5G-Globally Unique Temporary UE Identify
AF Application Function
AMF Access and Mobility Management function
AN Access Network
ANDSP Access Network Discovery and Selection Function
AUSF Authentication Server Function
CM Connected Mode
DL Down Link
DNN Data Network Name
DRX Discontinuous Reception
ETSI European Telecommunications Standards Institute
H-PCF Home Policy Control Function
HPLMN Home Public Land Mobile Network
GUAMI Globally Unique AMF Identifier
LADN Local Area Data Network
MICO mode preference Mobile Initiated Connection Only
MPS Multimedia Priority Service
MCS Modulation and Coding Scheme
N3IWF Non-3GPP InterWorking Function
NAS Non-Access Stratum
NF Network Function
NG-RAN Next Generation Node Radio Access Node
NGAP NG Application Protocol
NR Next Generation RAN
NSSAI Network Slice Selection Assistance Information
NSSF Network Slice Selection Function
OFDM Orthogonal Frequency-Division Multiplexing
OFDMA Orthogonal Frequency-Division Multiple Access
PLMN Public Land Mobile Network
PSI Public Service Identifier
PCF Policy Control Function
PDU Packet Data Unit.
PEI Permanent Equipment Identifier
RAN Radio Access Network
RAN CP Radio Access Network Control Plane
RAT Radio Access Technology
S-NSSAI Single-Network Slice Selection Assistance Information
SM NAS Session Management Non Access Stratum
SMF Session Management Function
SUCI Subscription Concealed Identifier
SUPI Subscription Permanent Identifier
TAI Tracking Area Identity
UDM Unified Data Management
UDSF Unstructured Data Storage Function
UDR Unified Data Repository
UE User Equipment
UE MM User Equipment Mobile Management
UE-TNLA User Equipment Transport Network Layer Association
UPF User Plane Function
V-PCF Visited Policy Control Function Clause 4.2.2.2.2 and 4.2.2.2.3 in ETSI 123.502, which is hereby incorporated by reference in its entirety, defines the registration procedure with AMF reallocation. The registration procedure, however, has security flaws that could lead to a registration failure of UEs. That is, in the idle mobility registration procedure with AMF reallocation, the registration could fail when (1) the initial AMF and the UE have established a new NAS security context that is different from the old NAS security context established between the old AMF and the UE, and (2) the target AMF fetched the old NAS security context of the UE from the old AMF and the target AMF has decided to use it. In this case, the NAS security context, including the $K_{AMF}$ (e.g., a mobility management key) used by the UE, is different (e.g., not matching) from that used by the target AMF. As such, the integrity check of the NAS message will fail, which in turn, causes a registration failure.

Accordingly, the system and method discussed herein modifies a registration request that an AMF (e.g., an initial AMF) receives from a UE to ensure that the UE passes the registration procedure during a handover to another AMF (e.g., a target AMF). In general, and discussed in greater detail below, when a UE sends a registration request (also referred to herein as, a Registration Request or RR message) including a device identifier (also referred to herein as, UE ID) to an initial AMF (e.g., initial AMF 406 in FIG. 4), the UE (e.g., UE 402 in FIG. 4) and the initial AMF establish a security association. In response to receiving the registration request from the UE, the initial AMF may reroute the registration request using either SUCI or a SUPI.

In the case of rerouting the RR message using SUCI, the initial AMF acknowledges (i.e., determines, detects) whether the RR message includes a SUCI or a 5G-GUTI. If the UE is registered via SUCI (i.e., the RR message includes a SUCI), then the initial AMF originates a Security Mode Command message to the UE. In some embodiments, the Security Mode Command message carries the redirection criteria that is acceptable as an Authentication Request message of non-integrity protection (i.e., a message that is not integrity protected) and/or carries an integrity negotiation algorithm (e.g., a NULL integrity negotiation algorithm). The UE then sets the redirection criteria and returns a Security Mode Complete message to the initial AMF. Responsive to setting the redirection criteria and/or returning the Security Mode Complete message, the UE can accept the Authentication Request message or all the messages that are not protected for integrity.

Alternatively, in the case of rerouting the RR message using SUCI and the UE is registered via 5G-GUTI (i.e., the RR message includes a 5G-GUTI), then the initial AMF originates the Security Mode Command message to the UE. In some embodiments, the Security Mode Command message carries the redirection criteria that is acceptable as an Authentication Request message of non-integrity protection and/or carries an integrity negotiation algorithm (e.g., a NULL integrity negotiation algorithm). After setting the redirection criteria, the UE sends back Security Mode Complete to the initial AMF. Responsive to setting the redirection criteria and/or returning the Security Mode Complete message, the UE can accept the Authentication Request message or all the messages that are not protected for integrity. The initial AMF then originates the identity Request message to the UE, requesting to obtain a SUCI causing the UE to send back (i.e., return) the identity Response message to the initial AMF, which carries the SUCI. In some embodiments, the identity Request/Response message may be parasitic in the Security Mode Command/Complete message as a message parameter. For example, the Security Mode Command message may carry the user ID SUCI request indication and the Security Mode Complete message may carry the user ID SUCI. The initial AMF may then use the SUCI to replace the 5G-GUTI in the RR message.

After obtaining a SUCI (i.e., either from the original RR message or from the UE upon verifying that the original RR message lacks a SUCI), the initial AMF sends a message to the target AMF that includes the RR message and the SUCI. The message causes the target AMF to authenticate the UE, such that the UE can then establish a new security association with the target AMF and/or deletes the redirection rule.

In the case of rerouting the RR message using SUPI, the initial AMF originates a Security Mode Command message to the UE. In some embodiments, the Security Mode Command message carries the redirection criteria that is acceptable as an Authentication Request message of non-integrity protection and/or carries an integrity negotiation algorithm (e.g., a NULL integrity negotiation algorithm). The UE then sets the redirection criteria and returns a Security Mode Complete message to the initial AMF. Responsive to setting the redirection criteria and/or returning the Security Mode Complete message, the UE can accept the Authentication Request message or all the messages that are not protected for integrity. The initial AMF then replaces the identifier (e.g., a 5G-GUTI or a SUCI) in the registration request message with a SUPI obtained from the UE. The initial AMF sends a message to the target AMF that includes the RR message and the SUPI. The message causes the target AMF to authenticate the UE, such that the UE can then establish a new security association with the target AMF and/or deletes the redirection rule.

Mobile Communication Technology and Environment

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
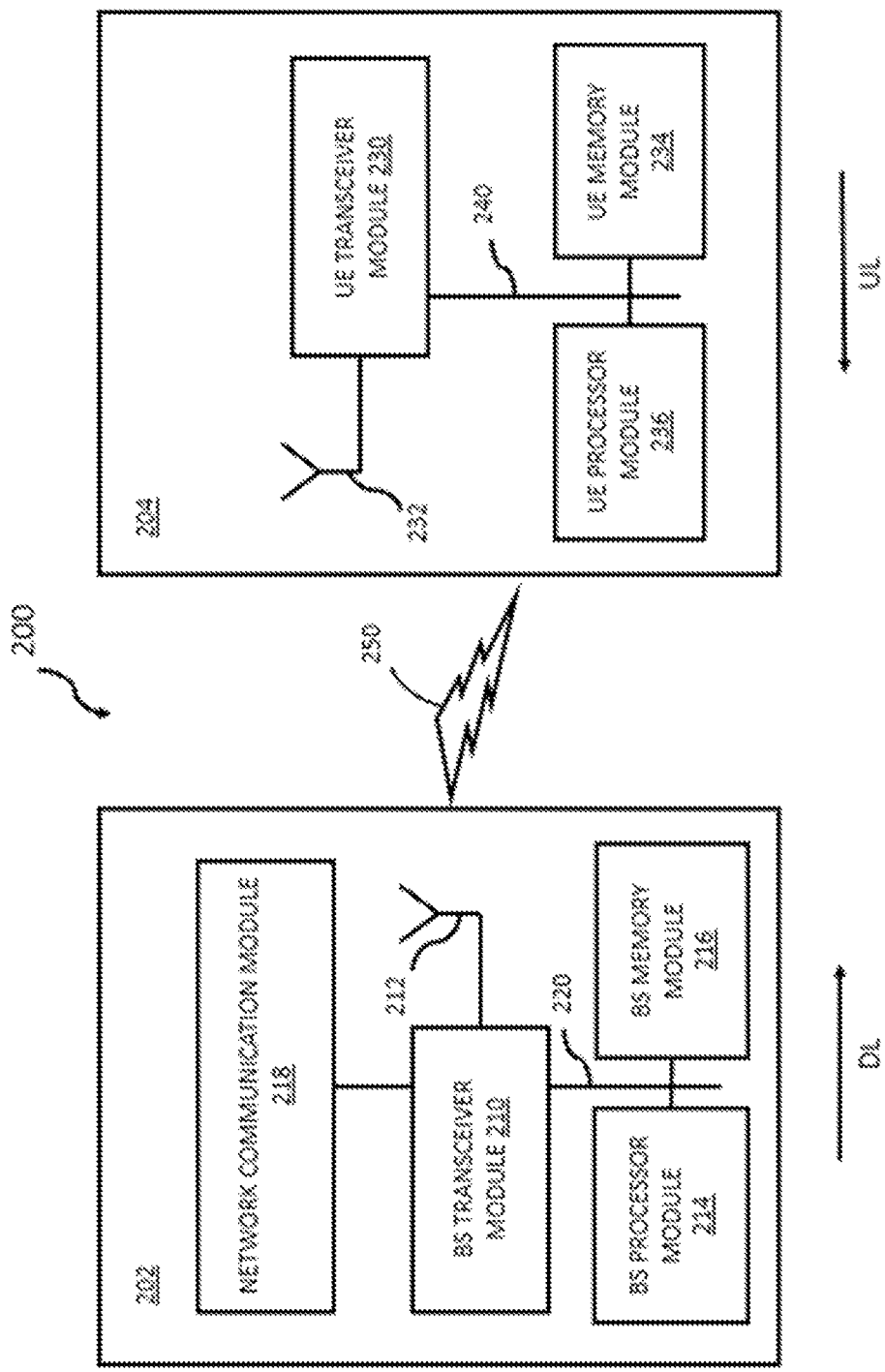
FIG. 2 illustrates block diagrams of an example base station and a user equipment device, in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Control (PDCL) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

Access and Mobility Management Function (AMF) Re-Allocation

Figure 3:
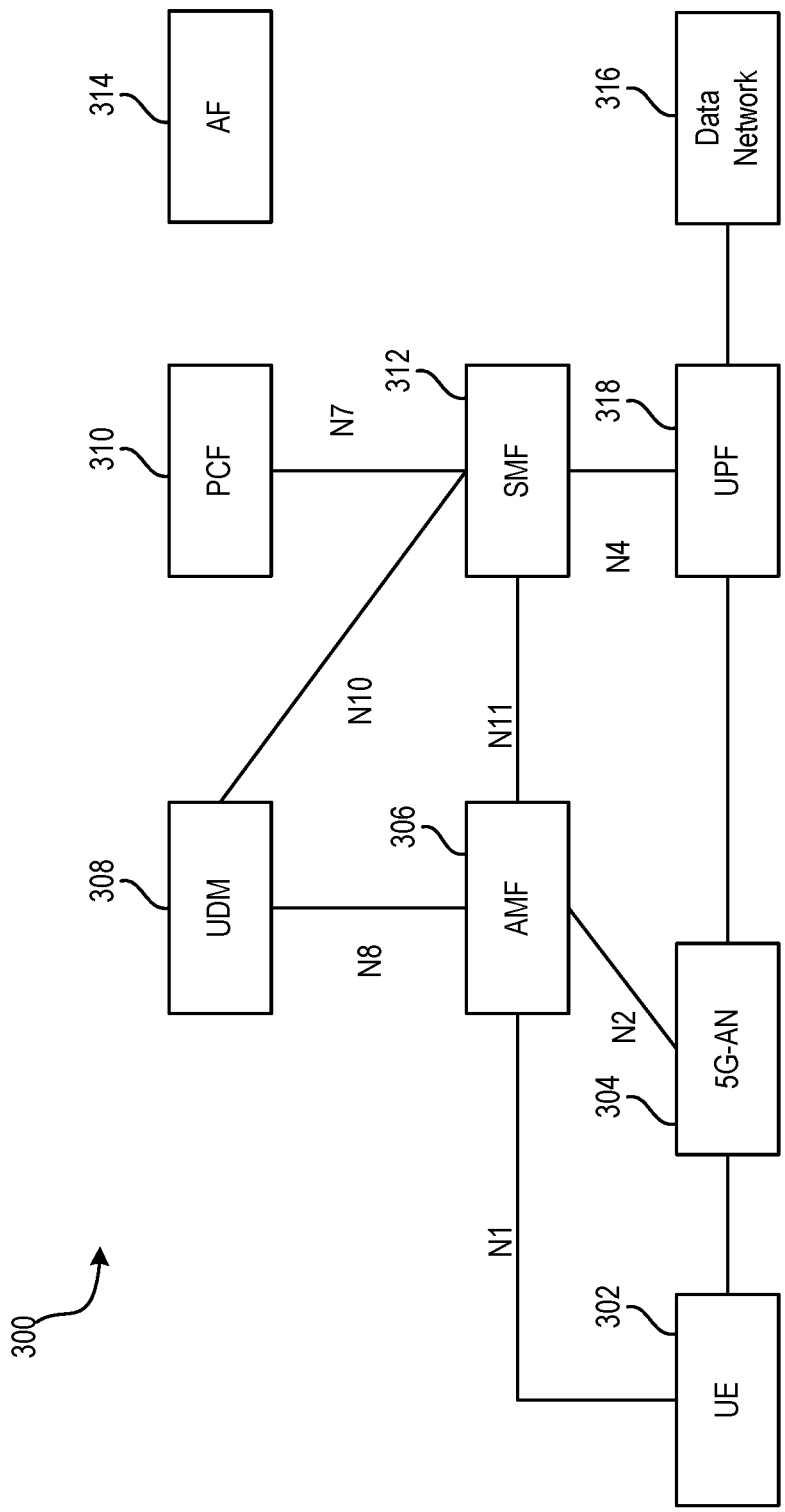
FIG. 3 illustrates a block diagram of an example architecture of a 5G system, in accordance with some embodiments of the present disclosure.

FIG. 3 illustrates a block diagram of an example architecture of a 5G system, in accordance with some embodiments of the present disclosure. The 5G system 300 includes various components, such as a UE 302 (e.g., UE 104 in FIG. 1), a 5G-AN 304, an AMF 306, a UDM 308, a PCF 310, an SMF 312, an AF 314, a UPF 318, and a data network 316. The AMF 306 includes one or more functionalities, such as UE mobility management, reachability management, connection management. Although shown with only one component of each type, the environment 300 may include any number of components (e.g., a plurality of UEs 302, a plurality of 5G-ANs 304, a plurality of AMFs 306, etc.) interconnected in any arrangement to facilitate the operations of the 5G system, as described herein.

The AMF 306 terminates the RAN CP interface (depicted in FIG. 3 as, N2) and NAS (depicted in FIG. 3 as, N1), NAS ciphering and integrity protection. The AMF 306 distributes the SM NAS to the proper SMFs 312 via the N11 interface. The SMF 312 includes a UE IP address allocation & management, selection and control of UPF 318, and PDU connection management.

The UPF 318 is the anchor point for Intra-/Inter-RAT mobility and the external PDU session point of interconnect to data network 316. The UPF 318 also routes and forwards the data packet as the indication from the SMF 312. The UPF 318 also buffer the DL data when the UE 302 is in idle mode. The UDM 308 stores the subscription profile for the UEs 302.

The PCF 310 generates the police to govern network behavior based on the subscription and indication from AF 314. The PCF 310 also provides policy rules to control plane functions (e.g., AMF 306 and SMF 312) to enforce them.

Figure 4:
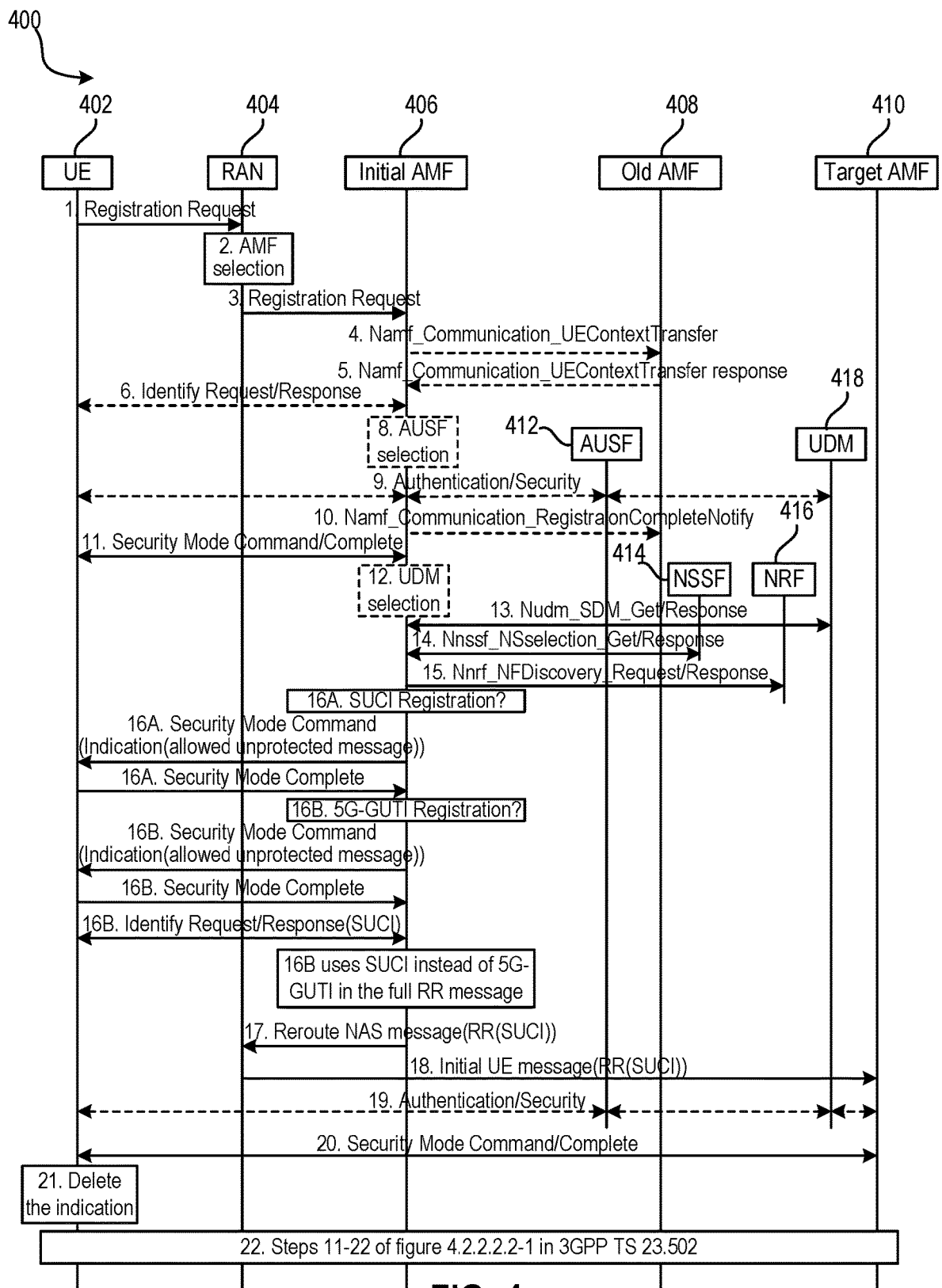
FIG. 4 illustrates a flow diagram of an example environment of a 5G system with AMF re-allocation for rerouting a registration request message with SUCI, in accordance with some embodiments of the present disclosure.

FIG. 4 illustrates a flow diagram of an example environment of a 5G system with AMF re-allocation for rerouting a registration request message with SUCI, in accordance with some embodiments of the present disclosure. The example environment 400 includes a UE 402, a RAN 404 (also referred to herein as, (R)AN), an initial AMF 406, an old AMF 408, and a target AMF 410. In some embodiments, the UE 402 may be UE 104 in FIG. 1. In some embodiments, any of initial AMF 406, old AMF 408, and target AMF 410 may be AMF 306 in FIG. 3 or any other AMF (not shown in FIG. 3) that includes some or all of the functionality of AMF 306.

At step 1 (labeled in FIG. 4 as, 1. Registration Request), the UE 402 sends (e.g., transmits, delivers) an AN message to a RAN 404 (e.g., a 5G gNB or BS 102 in FIG. 1). In some embodiments, the AN message may include AN parameters, a Registration Request (also referred to herein as, RR message), and/or UE Policy Container. In some embodiments, the Registration Request may include a Registration type, SUCI or 5G-GUTI (e.g., a device identifier associated with UE 402) or PEI, last visited TAI (if available), Security parameters, Requested NSSAI, [Mapping Of Requested NSSAI], Default Configured NSSAI Indication, UE Radio Capability Update, UE MM Core Network Capability, PDU Session status, List Of PDU Sessions To Be Activated, Follow-on request, MICO mode preference, Requested DRX parameters, [LADN DNN(s) or Indicator Of Requesting LADN Information], and/or [NAS message container]. In some embodiments, may include the list of PSIs and/or an indication of UE support for ANDSP and the operating system identifier.

In some embodiments, the UE Policy Container and its usage is be defined by 3GPP TS 23.503.

In the case of NG-RAN, the AN parameters may include 5G-S-TMSI or GUAMI, the Selected PLMN ID and Requested NSSAI, the AN parameters also include Establishment cause. The Establishment cause provides the reason for requesting the establishment of an RRC connection. Whether and how the UE includes the Requested NSSAI as part of the AN parameters is dependent on the value of the Access Stratum Connection Establishment NSSAI Inclusion Mode parameter, as specified in clause 5.15.9 of 3GPP TS 23.501, which is hereby incorporated by reference in its entirety.

The Registration type indicates if UE 402 wants to perform an Initial Registration (i.e. the UE 402 is in RM-DEREGISTERED state), a Mobility Registration Update (i.e. the UE 402 is in RM-REGISTERED state and initiates a Registration procedure due to mobility or due to the UE 402 needs to update its capabilities or protocol parameters, or to request a change of the set of network slices it is allowed to use), a Periodic Registration Update (i.e., the UE 402 is in RM-REGISTERED state and initiates a Registration procedure due to the Periodic Registration Update timer expiry, see clause 4.2.2.2.1 of 3GPP TS 23.502, which is hereby incorporated by reference in its entirety) or an Emergency Registration (i.e., the UE 402 is in limited service state).

When the UE 402 is performing an Initial Registration the UE 402 indicates its UE identity in the Registration Request message as follows, listed in decreasing order of preference:

a) a native 5G-GUTI assigned by the which the UE 402 is attempting to register, if available;

b) a native 5G-GUTI assigned by an equivalent PLMN to the PLMN to which the UE is attempting to register, if available; and c) a native 5G-GUTI assigned by any other PLMN, if available.

In some embodiments, this can also be a 5G-GUTI assigned via another access type. In some embodiments, the UE 402 may include its SUCI in the Registration Request, as defined in 3GPP TS 33.501, which is hereby incorporated by reference in its entirety.

The NAS message container may be included if the UE 402 is sending a Registration Request message as an Initial NAS message and the UE 402 has a valid 5G NAS security context and the UE 402 needs to send non-cleartext IEs, see clause 4.4.6 in 3GPP TS 24.501. If the UE does not need to send non-cleartext IEs, the UE 402 may send a Registration Request message without including the NAS message container.

If the UE 402 does not have a valid 5G NAS security context, the UE 402 may send the Registration Request message without including the NAS message container. The UE 402 may include the entire Registration Request message (i.e., containing cleartext IEs and non-cleartext IEs) in the NAS message container that is sent as part of the Security Mode Complete message in step 9b in FIG. 4.

When the UE 402 is performing an Initial Registration (i.e., the UE 402 is in RM-DEREGISTERED state) with a native 5G-GUTI then the UE 402 may indicate the related GUAMI information in the AN parameters. When the UE 402 is performing an Initial Registration with its SUCI, the UE 402 may not indicate any GUAMI information in the AN parameters.

For an Emergency Registration, the SUCI may be included if the UE 402 does not have a valid 5G-GUTI available; the PEI may be included when the UE 402 has no SUPI and no valid 5G-GUTI. In some embodiments, the 5G-GUTI is included and it indicates the last serving AMF.

The UE 402 may provide the UE's 402 usage setting based on its configuration as defined in clause 5.16.3.7 of 3GPP TS 23.501, which is hereby incorporated by reference in its entirety. The UE 402 provides Requested NSSAI as described in 3GPP TS 23.501 clause 5.15.5.2.1, and in the case of Initial Registration or Mobility Registration Update, the UE 402 includes the Mapping Of Requested NSSAI (if available), which is the mapping of each S-NSSAI of the Requested NSSAI to the HPLMN S-NSSAIs, to ensure that the network is able to verify whether the S-NSSAI(s) in the Requested NSSAI are permitted based on the Subscribed S-NS SAIs.

The UE 402 includes the Default Configured NSSAI Indication if the UE 402 is using a Default Configured NSSAI, as defined in 3GPP TS 23.501.

In the case of Mobility Registration Update, the UE 402 includes in the List Of PDU Sessions To Be Activated the PDU Sessions for which there are pending uplink data. When the UE 402 includes the List Of PDU Sessions To Be Activated, the UE 402 indicates PDU Sessions only associated with the access the Registration Request is related to. As defined in 3GPP TS 24.501, the UE 402 may include always-on PDU Sessions which are accepted by the network in the List Of PDU Sessions To Be Activated even if there are no pending uplink data for those PDU Sessions.

In some embodiments, a PDU Session corresponding to a LADN is not included in the List Of PDU Sessions To Be Activated when the UE 402 is outside the area of availability of the LADN.

The UE MM Core Network Capability is provided by the UE 402 and handled by AMF, as defined in TS 23.501 [2] clause 5.4.4a. The UE 402 includes in the UE MM Core Network Capability an indication if it supports Request Type flag "handover" for PDN connectivity request during the attach procedure as defined in clause 5.17.2.3.1 of 3GPP TS 23.501.

The UE 402 may provide either the LADN DNN(s) or an Indication Of Requesting LADN Information, as described in 3GPP TS 23.501 clause 5.6.5.

If available, the last visited TAI may be included in order to help the AMF produce Registration Area for the UE 402.

The Security parameters are used for Authentication and integrity protection, see TS 33.501 [15]. Requested NSSAI indicates the Network Slice Selection Assistance Information (as defined in clause 5.15 of 3GPP TS 23.501). The PDU Session status indicates the previously established PDU Sessions in the UE 402. When the UE 402 is connected to the two AMFs belonging to different PLMN via 3GPP access and non-3GPP access then the PDU Session status indicates the established PDU Session of the current PLMN in the UE 402.

The Follow-on request is included when the UE 402 has pending uplink signaling and the UE does not include List Of PDU Sessions To Be Activated, or the Registration type indicates the UE 402 wants to perform an Emergency Registration. In Initial Registration and Mobility Registration Update, the UE 402 provides the UE Requested DRX parameters, as defined in clause 5.4.5 of 3GPP TS 23.501.

The UE 402 provides UE Radio Capability Update indication as described in 3GPP TS 23.501.

At step 2 (labeled in FIG. 4 as, 2. AMF selection), if a 5G-S-TMSI or GUAMI is not included or the 5G-S-TMSI or GUAMI does not indicate a valid AMF the RAN 404, based on (R)AT and Requested NSSAI, if available, selects an AMF.

The RAN 404 selects an AMF as described in 3GPP TS 23.501, clause 6.3.5. If the UE 402 is in CM-CONNECTED state, the RAN 404 can forward the Registration Request message to the AMF based on the N2 connection of the UE 402.

If the RAN 404 cannot select an appropriate AMF, it forwards the Registration Request to an AMF which has been configured, in the RAN 404, to perform AMF selection.

At step 3 (labeled in FIG. 4 as, 3. Registration Request), the RAN 404 sends (i.e., transmits, delivers) an N2 message and a UE Policy Container to the initial AMF 406. In some embodiments, the N2 message includes N2 parameters and/or a Registration Request (as described in step 1 in FIG. 4).

When NG-RAN is used, the N2 parameters include the Selected PLMN ID, Location Information and Cell Identity related to the cell in which the UE 402 is camping, UE Context Request which indicates that a UE context including security information needs to be setup at the NG-RAN.

When NG-RAN is used, the N2 parameters also include the Establishment cause.

The Mapping Of Requested NSSAI is provided only if available.

If the Registration type indicated by the UE 402 is Periodic Registration Update, then steps 4 to 19 may be omitted.

When the Establishment cause is associated with priority services (e.g., MPS, MCS), the AMF includes a Message Priority header to indicate priority information. Other NFs relay the priority information by including the Message Priority header in service-based interfaces, as specified in 3GPP TS 29.500, which is hereby incorporated by reference in its entirety.

At step 4 (labeled in FIG. 4 as, 4. Namf_Communication_UEContextTransfer), the initial AMF 406 sends to the old AMF 408 a Namf_Communication_UEContextTransfer (complete Registration Request) and/or the initial AMF 406 sends to the UDSF (not shown in FIG. 4) a Nudsf_Unstructured Data Management_Query( ).

In the case with UDSF Deployment, if the UE's 402 5G-GUTI was included in the Registration Request and the serving AMF has changed since last Registration procedure, the initial AMF 406 and old AMF 408 are in the same AMF Set and UDSF is deployed, the initial AMF 406 retrieves the stored UE's 402 SUPI and UE context directly from the UDSF using Nudsf_UnstructuredDataManagement_Query service operation or they can share stored UE context via implementation specific means if UDSF is not deployed. This includes also event subscription information by each NF consumer for the given UE. In this case, the initial AMF 406 uses integrity protected complete Registration request NAS message to perform and verify integrity protection.

In the case without UDSF Deployment, if the UE's 402 5G-GUTI was included in the Registration Request and the serving AMF has changed since last Registration procedure, the initial AMF 406 may invoke the Namf_Communication_ UEContextTransfer service operation on the old AMF 408 including the complete Registration Request NAS message, which may be integrity protected, as well as the Access Type, to request the UE's SUPI and UE Context (see clause 5.2.2.2.2 of 3GPP TS 23.502 for details of this service operation.) In this case, the old AMF 408 uses either 5G-GUTI and the integrity protected complete Registration request NAS message, or the SUPI and an indication that the UE 402 is validated from the initial AMF 406, to verify integrity protection if the context transfer service operation invocation corresponds to the UE requested. The old AMF 408 also transfers the event subscriptions information by each NF consumer, for the UE 402, to the initial AMF 406.

If the old AMF 408 has PDU Sessions for another access type (e.g., different from the Access Type indicated in this step) and if the old AMF 408 determines that there is no possibility for relocating the N2 interface to the initial AMF 406, the old AMF 408 returns UE's SUPI and indicates that the Registration Request has been validated for integrity protection, but does not include the rest of the UE context.

In some embodiments, the initial AMF 406 sets the indication that the UE 402 is validated according to step 9a in FIG. 4, in case the initial AMF 406 has performed successful UE authentication after previous integrity check failure in the old AMF 408.

In some embodiments, the NF consumers does not need to subscribe for the events once again with the initial AMF 406 after the UE 402 is successfully registered with the initial AMF 406.

If the initial AMF 406 has already received UE contexts from the old AMF 408 during handover procedure, then steps 4, 5, and 10 in FIG. 4 may be skipped.

For an Emergency Registration, if the UE 402 identifies itself with a 5G-GUTI that is not known to the AMF, steps 4 and 5 in FIG. 4 may be skipped and the AMF immediately requests the SUPI from the UE 402. If the UE 402 identifies itself with PEI, the SUPI request may be skipped. Allowing Emergency Registration without a user identity may be dependent on local regulations.

At step 5 (labeled in FIG. 4 as, 5. Namf_Communication_UEContextTransfer response) the old AMF 408 sends to the initial AMF 406 a response to the Namf_Communication_UEContextTransfer and/or the UDSF (not shown in FIG. 4) sends to the initial AMF 406 a Nudsf_Unstructured Data Management_Query( ). In some embodiments, the Namf_Communication_UEContextTransfer may include a SUPI and/or UE Context in AMF (as per Table 5.2.2.2.2-1 of 3GPP TS 23.502). The old AMF 408 may start an implementation specific (guard) timer for the UE context.

If the UDSF was queried in step 4 in FIG. 4, the UDSF responds to the initial AMF 406 for the Nudsf_Unstructured Data Management_Query invocation with the related contexts including established PDU Sessions, the old AMF 408 includes SMF information DNN, S-NSSAI(s) and PDU Session ID, active NGAP UE-TNLA bindings to N3IWF, the old AMF includes information about the NGAP UE-TNLA bindings. If the old AMF 408 was queried in step 4 in FIG. 4, old AMF 408 responds to the initial AMF 406 for the Namf_Communication_UEContextTransfer invocation by including the UE's SUPI and UE Context.

If the old AMF 408 holds information about established PDU Session(s), the old AMF 408 includes SMF information, DNN(s), S-NSSAI(s) and PDU Session ID(s).

If the old AMF 408 holds UE context established via N3IWF, the old AMF 408 includes the CM state for UE 402 connected via N3IWF. If the UE 402 is in CM-CONNECTED state via N3IWF, the old AMF 408 includes information about the NGAP UE-TNLA bindings.

If the old AMF 408 fails the integrity check of the Registration Request NAS message, the old AMF 408 may indicate the integrity check failure.

If the old AMF 408 holds information about AM Policy Association and the information about UE Policy Association (i.e. the Policy Control Request Trigger for updating UE Policy as defined in 3GPP TS 23.503, which is hereby incorporated by reference in its entirety), the old AMF 408 includes the information about the AM Policy Association, the UE Policy Association and PCF ID. In the roaming case, V-PCF ID and H-PCF ID are included.

In some embodiments, when initial AMF 406 uses UDSF for context retrieval, interactions between the old AMF 408, the initial AMF 406, and the UDSF due to UE signaling on the old AMF 408 at the same time is implementation issue.

At step 6 (labeled in FIG. 4 as, 6. Identify Request/Response) the initial AMF 406 sends to the UE 402 an Identity Request ( ). If the SUCI is not provided by the UE 402 nor retrieved from the old AMF 408 the Identity Request procedure is initiated by AMF sending an Identity Request message to the UE 402 requesting the SUCI.

At step 7 (not shown in FIG. 4) the UE 402 sends to the initial AMF 406 an Identity Response ( ). In some embodiments, the UE 402 responds with an Identity Response message including the SUCI. The UE 402 derives (e.g., calculates, generates) the SUCI by using the provisioned public key of the HPLMN, as specified in 3GPP TS 33.501.

At step 8 (labeled in FIG. 4 as, AUSF selection), the initial AMF 406 may decide to initiate UE authentication by invoking an AUSF 412. In that case, the AMF selects an AUSF 412 based on SUPI or SUCI, as described in 3GPP TS 23.501, clause 6.3.4.

If the initial AMF 406 is configured to support Emergency Registration for unauthenticated SUPIs and the UE 402 indicated Registration type Emergency Registration, the initial AMF 406 skips the authentication or the initial AMF 406 accepts that the authentication may fail and continues the Registration procedure.

At step 9 (labeled in FIG. 4 as, Authentication/Security), if authentication is required, the initial AMF 406 requests it from the AUSF 412; if Tracing Requirements about the UE 402 are available at the initial AMF 406, the initial AMF 406 provides Tracing Requirements in its request to AUSF 412. Upon request from the initial AMF 406, the AUSF 412 may execute authentication of the UE 402. The authentication is performed as described in 3GPP TS 33.501. The AUSF 412 selects a UDM (e.g., UDM 418) as described in 3GPP TS 23.501, clause 6.3.8 and gets (e.g., fetches, retrieves, queries) the authentication data from UDM (e.g., UDM 418).

Once the UE 402 has been authenticated the AUSF 412 provides relevant security related information to the initial AMF 406. In case the initial AMF 406 provided a SUCI to AUSF 412, the AUSF 412 may return the SUPI to the initial AMF 406 only after the authentication is successful.

After successful authentication in initial AMF 406, which is triggered by the integrity check failure in old AMF 408 at step 5 in FIG. 4, the initial AMF 406 invokes step 4 in FIG. 4 again and indicates that the UE 402 is validated (i.e., through the reason parameter as specified in clause 5.2.2.2.2 of 3GPP TS 23.502).

At step 9b, if NAS security context does not exist, the NAS security initiation is performed as described in 3GPP TS 33.501. If the UE 402 had no NAS security context in step 1 in FIG. 4, the UE 402 includes the full Registration Request message as defined in 3GPP TS 24.501.

At step 9c, the initial AMF 406 initiates NGAP procedure to provide the 5G-AN with security context as specified in 3GPP TS 38.413, which is hereby incorporated by reference in its entirety, if the 5G-AN had requested for UE Context. Also, if the AMF does not support N26 for EPS interworking and it received UE MM Core Network Capability including an indication that it supports Request Type flag "handover" for PDN connectivity request during the attach procedure as defined in clause 5.17.2.3.1 of 3GPP TS 23.501, initial AMF 406 provides an indication "Redirection for EPS fallback for voice is possible" towards 5G-AN as specified in 3GPP TS 38.413. In addition, if Tracing Requirements about the UE 402 are available at the initial AMF 406, the initial AMF 406 provides the 5G-AN with Tracing Requirements in the NGAP procedure.

At step 9d, the 5G-AN stores the security context and acknowledges to the initial AMF 406. The 5G-AN uses the security context to protect the messages exchanged with the UE 402 as described in 3GPP TS 33.501.

At step 10 (labeled in FIG. 4 as, Namf_Communication_RegistrationCompleteNotify), the initial AMF 406 sends the Namf_Communication_RegistrationCompleteNotify ( ) to the old AMF 408. If the AMF has changed, then the initial AMF 406 notifies the old AMF 408 that the registration of the UE 402 in the initial AMF 406 is completed by invoking the Namf_Communication_RegistrationCompleteNotify service operation.

If the authentication/security procedure fails, then the Registration shall be rejected, and the initial AMF 406 invokes the Namf_Communication_RegistrationCompleteNotify service operation with a reject indication reason code towards the old AMF 408. The old AMF 408 continues as if the UE context transfer service operation was never received.

If one or more of the S-NSSAIs used in the old Registration Area cannot be served in the target Registration Area, the initial AMF 406 determines which PDU Session cannot be supported in the new Registration Area. The initial AMF 406 invokes the Namf_Communication_RegistrationCompleteNotify service operation including the rejected PDU Session ID and a reject cause (e.g., the S-NSSAI becomes no longer available) towards the old AMF 408. Then the new AMF modifies the PDU Session Status correspondingly. The old AMF 408 informs the corresponding SMF(s) to locally release the UE's SM context by invoking the Nsmf_PDUSession_ReleaseSMContext service operation, see clause 5.2.2.2.3 of 3GPP TS 23.502 for details of Namf_Communication_RegistrationCompleteNotify service operation.

If the initial AMF 406 received in the UE context transfer in step 3 in FIG. 4 the information about the AM Policy Association and the UE Policy Association and decides, based on local policies, not to use the PCF(s) identified by the PCF ID(s) for the AM Policy Association and the UE Policy Association, then it will inform the old AMF 408 that the AM Policy Association and the UE Policy Association in the UE context is not used any longer and then the PCF selection is performed.

At step 11 (labeled in FIG. 4 as, Security Mode Command/Complete), the initial AMF 406 sends the NAS Security Mode Command (SMC) to the UE 402. The UE 402 replies with NAS Security Mode Complete message containing a complete Registration Request message, as specified in clause 6.4.6 of 3GPP TS 33.501.

At step 12 (labeled in FIG. 4 as, UDM selection), if the initial AMF 406 needs UE's subscription information to decide whether to reroute the Registration Request and UE's slice selection subscription information was not provided by the old AMF 408, the AMF selects a UDM (e.g., UDM 418) as described in 3GPP TS 23.501, clause 6.3.8.

At step 13 (labeled in FIG. 4 as, Nudm_SDM_Get/Response), the initial AMF 406 may initiate the Nudm_SDM_Get procedure with the UDM 418.

In some embodiments, the initial AMF 406 sends the Nudm_SDM_Get to the UDM 418. In some embodiments, the Nudm_SDM_Get may include a SUPI and/or a Slice Selection Subscription data. The initial AMF 406 request UE's Slice Selection Subscription data from UDM by invoking the Nudm_SDM_Get (see clause 5.2.3.3.1 of 3GPP TS 23.502) service operation. The UDM 418 may get this information from UDR by Nudr_DM_Query. In some embodiments, the Nudr_DM_Query may include a SUPI and/or a Subscribed S-NSSAIs.

In some embodiments, the UDM 418 sends a Response to Nudm_SDM_Get to the initial AMF 406. The AMF gets the Slice Selection Subscription data including Subscribed S-NSSAIs. The UDM 418 may provide indication that the subscription data for network slicing is updated for the UE.

The UDM 418 responds with slice selection data to initial AMF 406.

At step 14 (labeled in FIG. 4 as, Nnssf_NSselection_Get/Response), the initial AMF 406 may initiate the Nnssf_NSSelection_Get procedure with the NSSF 414.

In some embodiments, the initial AMF 406 sends to the NSSF 414 a Nnssf_NSSelection_Get. In some embodiments, the Nnssf_NSSelection_Get may include a Requested NSSAI, a [Mapping Of Requested NSSAI], a Subscribed S-NSSAI(s) with the default S-NSSAI indication, a TAI, an Allowed NSSAI for the other access type (if any), a [Mapping of Allowed NSSAI], and/or PLMN ID of the SUPI).

If there is a need for slice selection, (see clause 5.15.5.2.1 of 3GPP TS 23.501), e.g. the initial AMF 406 cannot serve all the S-NSSAI(s) from the Requested NSSAI permitted by the subscription information, the initial AMF 406 invokes the Nnssf_NSSelection_Get service operation from the NSSF by including Requested NSSAI, optionally Mapping Of Requested NSSAI, Subscribed S-NSSAIs with the default S-NSSAI indication, Allowed NSSAI for the other access type (if any), Mapping of Allowed NSSAI, PLMN ID of the SUPI and the TAI of the UE 402.

In some embodiments, the NSSF 414 sends to the initial AMF 406 a Response to Nnssf_NSSelection_Get. In some embodiments, the Response may include AMF Set or list of AMF addresses, Allowed NSSAI for the first access type, [Mapping Of Allowed NSSAI], [Allowed NSSAI for the second access type], [Mapping of Allowed NSSAI], [NSI ID(s)], [NRF(s)], [List of rejected (S-NSSAI(s), cause value(s))], [Configured NSSAI for the Serving PLMN], and/or [Mapping Of Configured NSSAI]).

The NSSF 414 performs the steps specified in point (B) in clause 5.15.5.2.1 of 3GPP TS 23.501. The NSSF 414 returns to initial AMF 406 the Allowed NSSAI for the first access type, optionally the Mapping Of Allowed NSSAI, the Allowed NSSAI for the second access type (if any), optionally the Mapping of Allowed NSSAI and the target AMF Set or, based on configuration, the list of candidate AMF(s). The NSSF 414 may return NSI ID(s) associated to the Network Slice instance(s) corresponding to certain S-NSSAI(s). The NSSF 414 may return the NRF(s) (e.g., NRF 416 in FIG. 4) to be used to select NFs/services within the selected Network Slice instance(s). It may return also information regarding rejection causes for S-NSSAI(s) not included in the Allowed NSSAI. The NSSF 414 may return Configured NSSAI for the Serving PLMN, and possibly the associated mapping of the Configured NSSAI.

At step 15 (labeled in FIG. 4 as, Nnrf_NFDiscovery_Request/Response), the initial AMF 406 may initiate the Nnrf_NFDiscovery procedure with the NRF.

In some embodiments, the initial AMF 406 sends to the NRF 416 an Nnrf_NFDiscovery_Request. In some embodiments, the Nnrf_NFDiscovery_Request may include an NF type and/or an AMF Set.

If the initial AMF 406 does not locally store the target AMF address, and if the initial AMF 406 intends to use direct reroute to target AMF 410 or the reroute via (NG-R) AN message needs to include AMF address, then the initial AMF 406 invokes the Nnrf_NFDiscovery_Request service operation from the NRF to find a proper target AMF 410 which has required NF capabilities to serve the UE 402. The NF type is set to AMF. The AMF Set is included in the Nnrf_NFDiscovery_Request.

In some embodiments, the NRF 416 sends to the AMF a Response to Nnrf_NFDiscovery_Request. In some embodiments, the Response to Nnrf_NFDiscovery_Request includes a list of AMF pointer, AMF address, and/or additional selection rules and NF capabilities.

The NRF 416 replies with the list of potential target AMF(s). The NRF 416 may also provide the details of the services offered by the candidate AMF(s) along with the notification end-point for each type of notification service that the selected AMF had registered with the NRF 416, if available. As an alternative, it provides a list of potential target AMFs and their capabilities, and optionally, additional selection rules. Based on the information about registered NFs and required capabilities, a target AMF 410 is selected by the initial AMF 406.

If the initial AMF 406 is not part of the target AMF set, and is not able to get a list of candidate AMF(s) by querying the NRF 416 with the target AMF set (e.g., the NRF locally pre-configured on AMF does not provide the requested information, the query to the appropriate NRF 416 provided by the NSSF 414 is not successful, or the initial AMF 406 has knowledge that the initial AMF 406 is not authorized as serving AMF etc.) then the initial AMF 406 shall forward the NAS message to the target AMF 410 via (R)AN executing; the Allowed NSSAI and the AMF Set are included to enable the (R)AN 404 to select the target AMF 410 as described in 3GPP TS 23.501 clause 6.3.5.

At step 16 (labeled in FIG. 4 as, SUCI Registration?"), the initial AMF 406 acknowledges (i.e., determines, detects) whether the Registration Request message includes a SUCI or a 5G-GUTI.

At step 16A (labeled in FIG. 4 as, 16A. Security Mode Command (Indication(allowed unprotected message))), when the UE 402 is registered via SUCI, the initial AMF 406 originates a Security Mode Command message to the UE 406. In some embodiments, the Security Mode Command message carries the redirection criteria that is acceptable as an Authentication Request message of non-integrity protection and/or carries the an integrity negotiation algorithm (e.g., NULL integrity negotiation algorithm).

At step 16A (labeled in FIG. 4 as, 16A. Security Mode Complete), the UE 402 sets the redirection criteria and returns a Security Mode Complete message to the initial AMF 402. After that, the UE 402 can accept the Authentication Request message and/or all the messages that are not protected for integrity.

At step 16B (labeled in FIG. 4 as, 16B. Security Mode Command (Indication(allowed unprotected message))), when the UE 402 is registered via 5G-GUTI, the initial AMF 406 originates the Security Mode Command message to the UE 402. In some embodiments, the Security Mode Command message may carries the redirection criteria that is acceptable as Authentication Request message of non-integrity protection and/or carries an integrity negotiation algorithm (e.g., NULL integrity negotiation algorithm).

At step 16B (labeled in FIG. 4 as, 16B. Security Mode Complete), after setting the redirection criteria, the UE 402 sends back Security Mode Complete to the initial AMF 406. After that, the UE 402 can accept the Authentication Request message and/or all the messages that are not protected for integrity. The initial AMF originates the identity Request message to the UE, requesting to obtain SUCI. The UE 402 sends back to the initial AMF 406 the identity Response message, which carries (e.g., includes) the SUCI. In some embodiments, the identity Request/Response message may also be parasitic in the Security Mode Command/Complete message as a message parameter. For example, the Security Mode Command message carries the user ID SUCI request indication, and the Security Mode Complete message carries the user ID SUCI.

At step 16B (labeled in FIG. 4 as, 16B. uses SUCI instead of 5G-GUTI in the full RR message), the initial AMF 406 replaces the 5G-GUTI in the registration request message with the SUCI.

At step 17 (labeled in FIG. 4 as, 17. Reroute NAS message(RR(SUCI))), if the initial AMF 406, based on local policy and subscription information, decides to forward the NAS message to the target AMF 410 via (R)AN 404 unless the target AMF(s) 410 are returned from the NSSF 414 and identified by a list of candidate AMF(s), the initial AMF 406 sends a Reroute NAS message to the (R)AN 404. The Reroute NAS message includes the information about the target AMF 410, and the full Registration Request message include SUCI. If the initial AMF 406 has obtained the information as described at step 14b, that information is included.

At step 18 (labeled in FIG. 4 as, 18. Initial UE message (RR(SUCI))), the (R)AN 404 sends the initial UE message to the target AMF 410 indicating reroute due to slicing including the information from step 14b in FIG. 4 that the NSSF 414 provided.

At step 19 (labeled in FIG. 4 as, 19. Authentication/Security), the environment 400 performs authentication/security.

In some embodiments, if authentication is required, the target AMF 410 requests it from the AUSF 412; if Tracing Requirements about the UE 402 are available at the target AMF 410, the target AMF 410 provides Tracing Requirements in its request to AUSF 412. Upon request from the target AMF 410, the AUSF 412 shall execute authentication of the UE 402. The authentication is performed as described in 3GPP TS 33.501. The AUSF 412 selects a UDM 418 as described in 3GPP TS 23.501, clause 6.3.8 and gets the authentication data from UDM 418.

Once the UE 402 has been authenticated the AUSF 412 provides relevant security related information to the target AMF 410.

After successful authentication in target AMF 410, which is triggered by the integrity check failure in initial AMF 406 at step 21, the target AMF 410 invokes step 20 above again and indicates that the UE 402 is validated (i.e. through the reason parameter as specified in clause 5.2.2.2.2 of 3GPP TS 23.502).

In some embodiments, the target AMF initiates NGAP procedure to provide the 5G-AN with security context as specified in 3GPP TS 38.413 if the 5G-AN had requested for UE Context. Also, if the target AMF does not support N26 for EPS interworking and it received UE MM Core Network Capability including an indication that it supports Request Type flag "handover" for PDN connectivity request during the attach procedure as defined in clause 5.17.2.3.1 of 3GPP TS 23.501, target AMF provides an indication "Redirection for EPS fallback for voice is possible" towards 5G-AN as specified in 3GPP TS 38.413. In addition, if Tracing Requirements about the UE are available at the target AMF, the target AMF provides the 5G-AN with Tracing Requirements in the NGAP procedure.

In some embodiments, the 5G-AN stores the security context and acknowledges to the target AMF 410. The 5G-AN uses the security context to protect the messages exchanged with the UE 402 as described in 3GPP TS 33.501.

At step 20 (labeled in FIG. 4 as, 20. Security Mode Command/Complete), the target AMF 410 sends the NAS Security Mode Command (SMC) to the UE 402. The UE 402 replies with NAS Security Mode Complete message containing a complete Registration Request message, as specified in clause 6.4.6 of 3GPP TS 33.501.

At step 21 (labeled in FIG. 4 as, 21. Delete the indication), the UE 402 deletes the reroute rules in step 16. If UE 402 is set a NULL integrity protected Algorithm in step 16, this step is omitted.

At step 22 (labeled in FIG. 4 as 22. Steps 11-22 of FIG. 4.2.2.2.2-1 in 3GPP TS 23.502), after receiving the Registration Request message transmitted, if the UE context is received from the initial AMF 406, the target AMF 410 continues with the Registration procedure from step 11 until step 22 of FIG. 4.2.2.2.2-1 of 3GPP TS 23.502.

Figure 5:
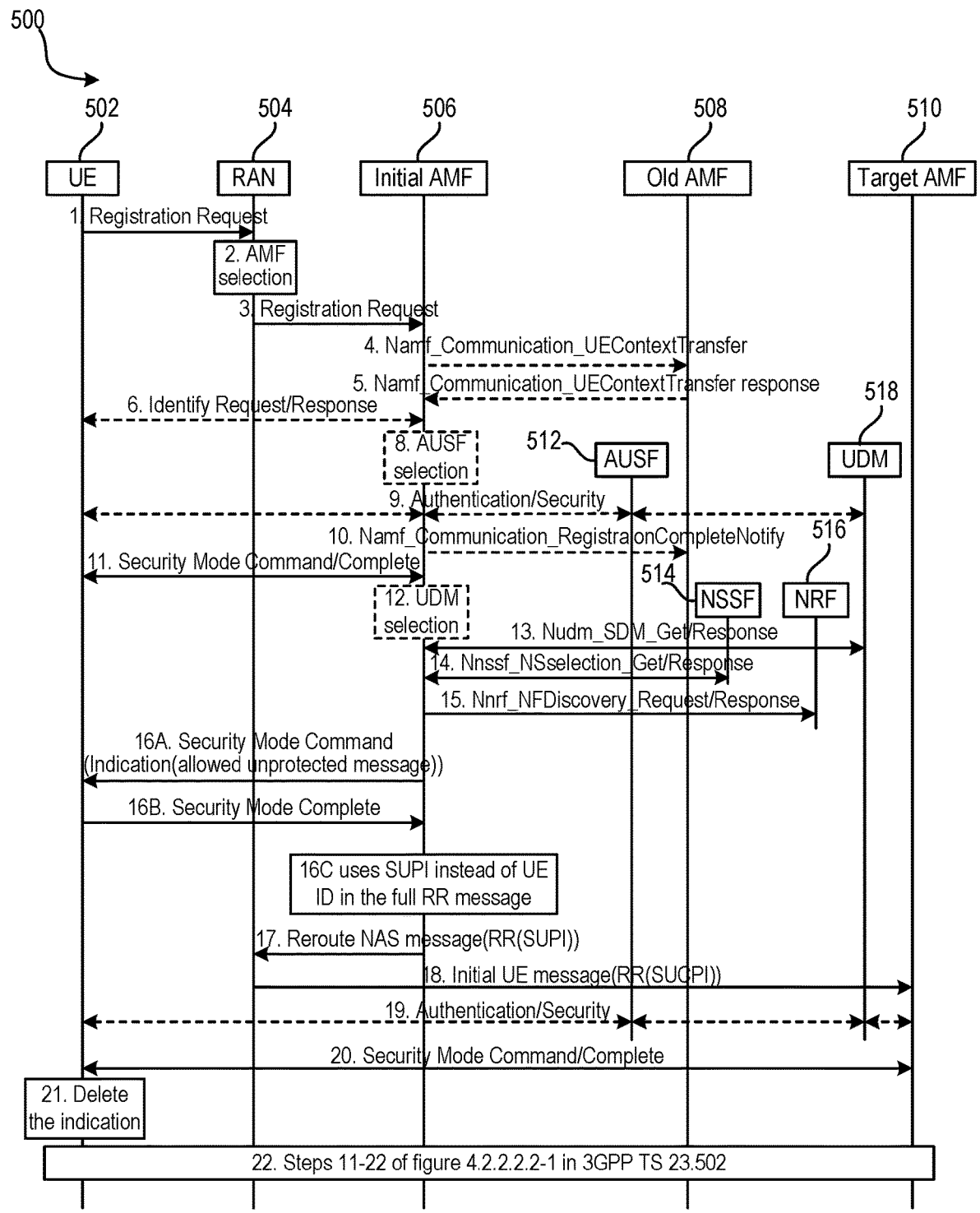
FIG. 5 illustrates a flow diagram of an example environment of a 5G system with AMF re-allocation for rerouting a registration request message with SUPI, in accordance with some embodiments of the present disclosure.

FIG. 5 illustrates a flow diagram of an example environment of a 5G system with AMF re-allocation for rerouting a registration request message with SUPI, in accordance with some embodiments of the present disclosure. The example environment 500 includes a UE 502, a RAN 504 (also referred to herein as, (R)AN), an initial AMF 506, an old AMF 508, and a target AMF 510. In some embodiments, the UE 502 may be UE 104 in FIG. 1. In some embodiments, any of initial AMF 506, old AMF 508, and target AMF 510 may be AMF 306 in FIG. 3 or any other AMF (e.g., any shown in FIG. 4) that includes some or all of the functionality of AMF 306. In some embodiments, the AUSF 512 may be AUSF 412 in FIG. 4. In some embodiments, the NSSF 514 may be NSSF 414 in FIG. 4. In some embodiments, the NRF 516 may be NRF 416 in FIG. 4. In some embodiments, the UDM 518 may be UDM 418 in FIG. 4.

In some embodiments, steps 1-15 in FIG. 5 are the same as steps 1-15 in FIG. 5, respectively.

At step 16A (labeled in FIG. 5 as, 16A Security Mode Command (Indication(allowed unprotected message))), the initial AMF 506 originates Security Mode Command message to the UE 502, which carries the redirection criteria, which are acceptable as Authentication Request message of non-integrity protection, or carries the NULL integrity negotiation algorithm.

At step 16A (labeled in FIG. 5 as, 16B. Security Mode Complete], the UE 502 sets the redirection criteria and returns Security Mode Complete to initial AMF 506. After that, the UE 502 can accept the Authentication Request message or all the messages that are not protected for integrity.

At step 16C (labeled in FIG. 5 as, 16C. uses SUPI instead of UE IS in the full RR message], the initial AMF 506 replaces the 5G-GUTI or SUCI in the registration request message with the SUPI obtained in step 5 or step 9.

At step 17 (labeled in FIG. 5 as, 17. Reroute NAS message(RR(SUPI))), if the initial AMF 506, based on local policy and subscription information, decides to forward the NAS message to the target AMF 510 via (R)AN 504 unless the target AMF(s) are returned from the NSSF and identified by a list of candidate AMF(s), the initial AMF 506 sends a Reroute NAS message to the (R)AN 504. The Reroute NAS message includes the information about the target AMF 510, and the full Registration Request message include SUPI. If the initial AMF 506 has obtained the information as described at step 14b in FIG. 5, that information is included.

At step 18 (labeled in FIG. 5 as, initial UE message(RR (SUPI))), the (R)AN 504 sends the initial UE message to the target AMF 510 indicating reroute due to slicing including the information from step 14b in FIG. 5 that the NSSF 516 provided.

At step 19 (labeled in FIG. 5 as, 19. Authentication/Security), the environment 500 performs authentication/security.

In some embodiments, if authentication is required, the target AMF 510 requests it from the AUSF 512; if Tracing Requirements about the UE 502 are available at the target AMF 510, the target AMF 510 provides Tracing Requirements in its request to AUSF 512. Upon request from the target AMF 510, the AUSF 512 shall execute authentication of the UE 502. The authentication is performed as described in 3GPP TS 33.501. The AUSF 512 selects a UDM 518 as described in 3GPP TS 23.501, clause 6.3.8 and gets the authentication data from UDM 518.

Once the UE 502 has been authenticated the AUSF 512 provides relevant security related information to the target AMF 510.

In some embodiments, the target AMF 510 initiates NGAP procedure to provide the 5G-AN with security context as specified in 3GPP TS 38.413 if the 5G-AN had requested for UE Context. Also, if the target AMF 510 does not support N26 for EPS interworking and it received UE MM Core Network Capability including an indication that it supports Request Type flag "handover" for PDN connectivity request during the attach procedure as defined in clause 5.17.2.3.1 of 3GPP TS 23.501, target AMF 510 provides an indication "Redirection for EPS fallback for voice is possible" towards 5G-AN as specified in 3GPP TS 38.413. In addition, if Tracing Requirements about the UE 502 are available at the target AMF, the target AMF 510 provides the 5G-AN with Tracing Requirements in the NGAP procedure.

In some embodiments, the 5G-AN stores the security context and acknowledges to the target AMF 510. The 5G-AN uses the security context to protect the messages exchanged with the UE 502 as described in 3GPP TS 33.501.

At step 20 (labeled in FIG. 5 as, 20. Security Mode Command/Complete), the Target AMF 510 sends the NAS Security Mode Command (SMC) to the UE 502. The UE 502 replies with NAS Security Mode Complete message containing a complete Registration Request message, as specified in clause 6.4.6 of 3GPP TS 33.501.

At step 21 (labeled in FIG. 5 as, 21. Delete the indication), the UE 502 deletes the reroute rules in step 16 in FIG. 5. If UE 502 is set a NULL integrity protected Algorithm in step 16A in FIG. 5, this step is omitted.

At step 22 (labeled in FIG. 5, 22. Steps 11-22 of FIG. 4.2.2.2.2-1 in 3GPP TS 23.502), after receiving the Registration Request message transmitted, if the UE 502 context is received from the initial AMF 506, the target AMF 510 continues with the Registration procedure from step 11 in FIG. 5 until step 22 of FIG. 4.2.2.2.2-1 of 3GPP TS 23.502.

Figure 6:
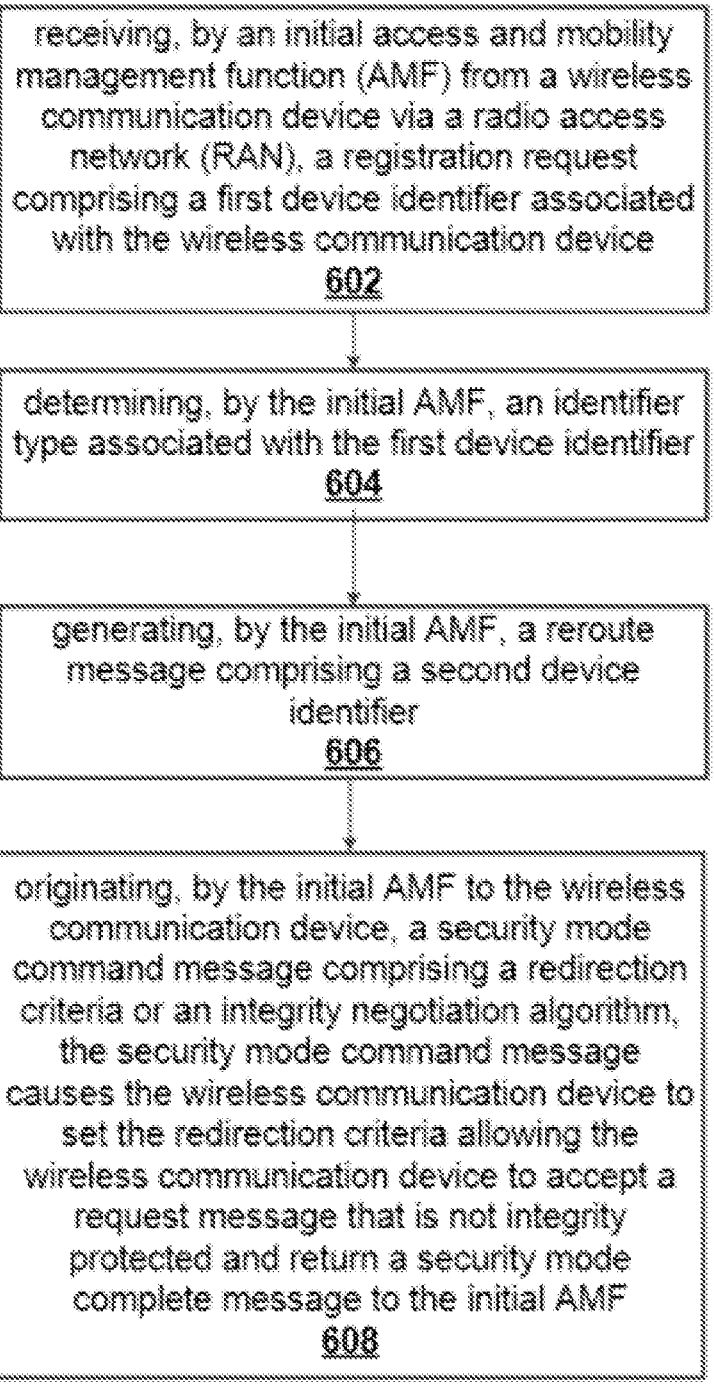
FIG. 6 is a flow diagram depicting a method for registration with access and mobility management function re-allocation from the perspective of an initial AMF, in accordance with some embodiments of the present disclosure.

FIG. 6 is a flow diagram depicting a method for registration with access and mobility management function reallocation from the perspective of an initial AMF, in accordance with some embodiments of the present disclosure. Additional, fewer, or different operations may be performed in the method depending on the particular embodiment. In some embodiments, some or all operations of method 600 may be performed by a wireless communication node, such as BS 102 in FIG. 1. In some operations, some or all operations of method 600 may be performed by a wireless communication device, such as UE 104 in FIG. 1. In some operations, some or all operations of method 600 may be performed by an AMF, such as initial AMF 406, old AMF 408, target AMF 410, initial AMF 506, old AMF 508, and/or target AMF 510. Each operation may be re-ordered, added, removed, or repeated.

As shown, the method 600 includes the operation 602 of receiving, by an initial access and mobility management function (AMF) from a wireless communication device via a radio access network (RAN), a registration request comprising a first device identifier associated with the wireless communication device. The method 600 includes the operation 604 of determining, by the initial AMF, an identifier type associated with the first device identifier. The method 600 includes the operation 606 of generating, by the initial AMF, a reroute message comprising a second device identifier. The method 600 includes the operation 608 of originating, by the initial AMF to the wireless communication device, a security mode command message comprising a redirection criteria or an integrity negotiation algorithm, the security mode command message causes the wireless communication device to set the redirection criteria allowing the wireless communication device to accept a request message that is not integrity protected and return a security mode complete message to the initial AMF.

FIG. 7 is a flow diagram depicting a method for registration with access and mobility management function reallocation from the perspective of a target AMF, in accordance with some embodiments of the present disclosure. Additional, fewer, or different operations may be performed in the method depending on the particular embodiment. In some embodiments, some or all operations of method 700 may be performed by a wireless communication node, such as BS 102 in FIG. 1. In some operations, some or all operations of method 700 may be performed by a wireless communication device, such as UE 104 in FIG. 1. In some operations, some or all operations of method 700 may be performed by an AMF, such as initial AMF 406, old AMF 408, target AMF 410, initial AMF 506, old AMF 508, and/or target AMF 510. Each operation may be re-ordered, added, removed, or repeated.

As shown, the method 700 includes the operation 702 of receiving, by a target access and mobility management function (AMF) from an initial AMF via a radio access network (RAN), a reroute message comprising a second device identifier, the reroute message generated by the initial AMF responsive to receiving a registration request comprising a first device identifier associated with a wireless communication device and determining an identifier type associated with the first device identifier. The method 700 includes the operation 704 of authenticating, by the target AMF responsive to receiving the reroute message, the wireless communication device with the target AMF. The method 700 includes the operation 706 of transmitting, by the target AMF, a security mode command to the wireless communication device indicating that the target AMF authenticated the wireless communication device.

Figure 8:
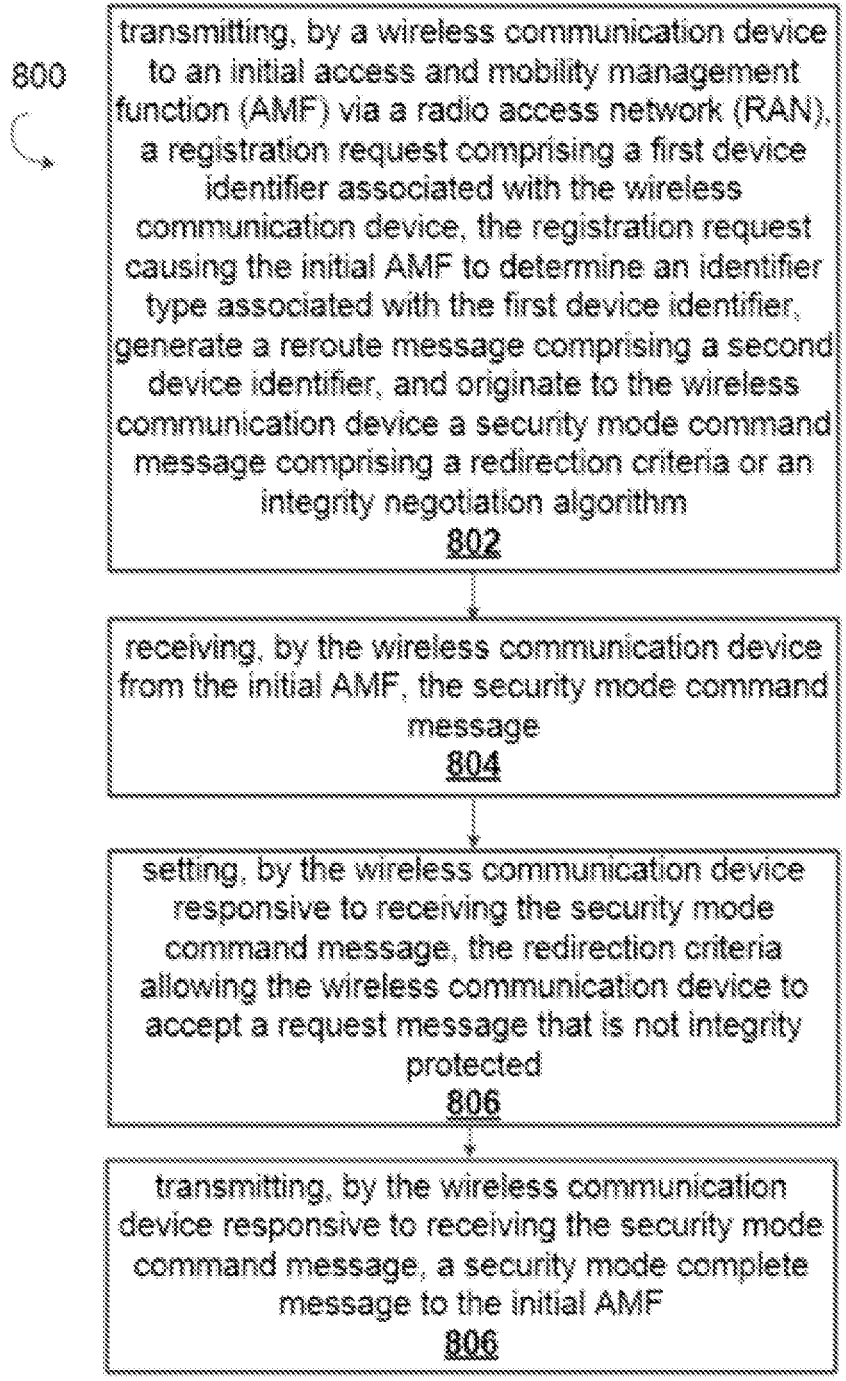
FIG. 8 is a flow diagram depicting a method for registration with access and mobility management function re-allocation from the perspective of a wireless communication device, in accordance with some embodiments of the present disclosure.

FIG. 8 is a flow diagram depicting a method for registration with access and mobility management function reallocation from the perspective of a wireless communication device, in accordance with some embodiments of the present disclosure. Additional, fewer, or different operations may be performed in the method depending on the particular embodiment. In some embodiments, some or all operations of method 800 may be performed by a wireless communication node, such as BS 102 in FIG. 1. In some operations, some or all operations of method 800 may be performed by a wireless communication device, such as UE 104 in FIG. 1. In some operations, some or all operations of method 800 may be performed by an AMF, such as initial AMF 406, old AMF 408, target AMF 410, initial AMF 506, old AMF 508, and/or target AMF 510. Each operation may be re-ordered, added, removed, or repeated.

As shown, the method 800 includes the operation 802 of transmitting, by a wireless communication device to an initial access and mobility management function (AMF) via a radio access network (RAN), a registration request comprising a first device identifier associated with the wireless communication device, the registration request causing the initial AMF to determine an identifier type associated with the first device identifier, generate a reroute message comprising a second device identifier, and originate to the wireless communication device a security mode command message comprising a redirection criteria or an integrity negotiation algorithm. The method 800 includes the operation 804 receiving, by the wireless communication device from the initial AMF, the security mode command message. The method 800 includes the operation 806 setting, by the wireless communication device responsive to receiving the security mode command message, the redirection criteria allowing the wireless communication device to accept a request message that is not integrity protected. The method 800 includes the operation 808 of transmitting, by the wireless communication device responsive to receiving the security mode command message, a security mode complete message to the initial AMF.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

What is claimed is:

1. A method, comprising,
receiving, by an initial access and mobility management function (AMF) from a wireless communication device via a radio access network (RAN), a registration request comprising a first device identifier associated with the wireless communication device;
determining, by the initial AMF, an identifier type associated with the first device identifier;
generating, by the initial AMF, a reroute message comprising a second device identifier; and
originating, by the initial AMF to the wireless communication device, a security mode command message comprising a redirection criteria or an integrity negotiation algorithm, the security mode command message causes the wireless communication device to set the redirection criteria allowing the wireless communication device to accept a request message that is not integrity protected and return a security mode complete message to the initial AMF.

2. The method of claim 1, wherein the request message comprises an authentication request message to authenticate the wireless communication device.

3. The method of claim 1, further comprising:
determining, by the initial AMF, an association between the identifier type and a Subscription Concealed Identifier (SUCI), wherein the second device identifier is the first device identifier of the registration request.

4. The method of claim 1, further comprising:
determining, by the initial AMF, an association between the identifier type and a 5th Generation Globally Unique Temporary User Equipment Identifier (5G-GUTI); and
originating, by the initial AMF to the wireless communication device responsive to determining the association, an identity request message requesting a Subscription Concealed Identifier (SUCI) associated with the wireless communication device, the identity request message causing the wireless communication device to transmit to the initial AMF an identity request response message comprising the SUCI associated with the wireless communication device.

5. The method of claim 4, wherein the security mode command message comprises the identity request message, wherein and the security mode complete message comprises the identity request response message.

6. The method of claim 4, wherein generating the reroute message comprises: replacing, by the initial AMF, the first device identifier of the registration request with the SUCI associated with the wireless communication device.

7. The method of claim 1, further comprising:
determining, by the initial AMF, an association between the identifier type and a 5th Generation Globally Unique Temporary User Equipment Identifier (5G-GUTI) or a Subscription Concealed Identifier (SUCI); and
obtaining, by the initial AMF and from an old AMF or an authentication server function (AUSF), a Subscription Permanent Identifier (SUPI) associated with the wireless communication device.

8. The method of claim 7, wherein generating the reroute message comprises: replacing, by the initial AMF, the first device identifier of the registration request with the SUPI associated with the wireless communication device.

9. The method of claim 3, further comprising:
transmitting, by the initial AMF to a target AMF via the RAN, the reroute message causing the target AMF to authenticate the wireless communication device with the target AMF and transmit a second security mode command to the wireless communication device indicating that the target AMF authenticated the wireless communication device.

10. A device, comprising:
at least one processor configured to:
receive, via a receiver from a wireless communication device via a radio access network (RAN), a registration request comprising a first device identifier associated with the wireless communication device;
determine an identifier type associated with the first device identifier;
generate a reroute message comprising a second device identifier; and
originate, to the wireless communication device, a security mode command message comprising a redirection criteria or an integrity negotiation algorithm, the security mode command message causes the wireless communication device to set the redirection criteria allowing the wireless communication device to accept a request message that is not integrity protected and return a security mode complete message to the initial AMF.

11. A method, comprising,
transmitting, by a wireless communication device to an initial access and mobility management function (AMF) via a radio access network (RAN), a registration request comprising a first device identifier associated with the wireless communication device, the registration request causing the initial AMF to determine an identifier type associated with the first device identifier, generate a reroute message comprising a second device identifier, and originate to the wireless communication device a security mode command message comprising a redirection criteria or an integrity negotiation algorithm;
receiving, by the wireless communication device from the initial AMF, the security mode command message;
setting, by the wireless communication device responsive to receiving the security mode command message, the redirection criteria allowing the wireless communication device to accept a request message that is not integrity protected; and
transmitting, by the wireless communication device responsive to receiving the security mode command message, a security mode complete message to the initial AMF.

12. The method of claim 11, wherein the request message comprises an authentication request message to authenticate the wireless communication device.

13. The method of claim 11, wherein the initial AMF determines an association between the identifier type and a Subscription Concealed Identifier (SUCI), wherein the second device identifier is the first device identifier of the registration request.

14. The method of claim 11, further comprising:
receiving, by the wireless communication device from the initial AMF, an identity request message requesting a Subscription Concealed Identifier (SUCI) associated with the wireless communication device, wherein the initial AMF originates the identity request message to the wireless communication device responsive to determining an association between the identifier type and a 5th Generation Globally Unique Temporary User Equipment Identifier (5G-GUTI); and
transmitting, by the wireless communication device to the initial AMF and responsive to receiving the identity request, an identity request response message comprising the SUCI associated with the wireless communication device.

15. The method of claim 14, wherein the security mode command message comprises the identity request message, and the security mode complete message comprises the identity request response message.

16. The method of claim 14, wherein the initial AMF generates the reroute message by replacing the first device identifier of the registration request with the SUCI associated with the wireless communication device.

17. The method of claim 11, comprising:
receiving, by the wireless communication device from the initial AMF, a second request message requesting a Subscription Permanent Identifier (SUPI) associated with the wireless communication device, wherein the initial AMF transmits the second request message to the wireless communication device responsive to determining an association between the identifier type and a 5th Generation Globally Unique Temporary User Equipment Identifier (5G-GUTI).

18. The method of claim 17, wherein the initial AMF generates the reroute message by replacing the first device identifier of the registration request with the SUPI associated with the wireless communication device.

19. The method of claim 13, further comprising:
receiving, by the wireless communication device from a target AMF, a second security mode command indicating that the target AMF authenticated the wireless communication device, wherein the target AMF authenticated the wireless communication device responsive to receiving the reroute message from the initial AMF via the RAN.

20. A wireless communication device, comprising:
at least one processor configured to:
- transmit, via a transmitter to an initial access and mobility management function (AMF) via a radio access network (RAN), a registration request comprising a first device identifier associated with the wireless communication device, the registration request causing the initial AMF to determine an identifier type associated with the first device identifier, generate a reroute message comprising a second device identifier, and originate to the wireless communication device a security mode command message comprising a redirection criteria or an integrity negotiation algorithm;
- receive, from the initial AMF, the security mode command message;
- set, responsive to receiving the security mode command message, the redirection criteria allowing the wireless communication device to accept a request message that is not integrity protected; and
- transmit, via the transmitter responsive to receiving the security mode command message, a security mode complete message to the initial AMF.

* * * * *